US012743711B2

(12) United States Patent
Eby et al.

(10) Patent No.: US 12,743,711 B2
(45) Date of Patent: Sep. 22, 2026

(54) GENERATIVE ARTIFICIAL INTELLIGENCE UPSELL ENGINE

(71) Applicant: American Express Travel Related Services Company, Inc., New York, NY (US)

(72) Inventors: Alaric M. Eby, Scottsdale, AZ (US); Andras L. Ferenczi, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/936,397

(22) Filed: Nov. 4, 2024

(65) Prior Publication Data

US 2026/0127631 A1 May 7, 2026

(51) Int. Cl.
*G06Q 30/00* (2023.01)
*G06Q 30/0238* (2023.01)

(52) U.S. Cl.
CPC ................................ *G06Q 30/0238* (2013.01)

(58) Field of Classification Search
CPC .................................................. G06Q 30/0238
See application file for complete search history.

(56) References Cited

U.S. PATENT DOCUMENTS

| | | | | |
|---|---|---|---|---|
| 11,810,176 | B2 * | 11/2023 | Edwards | G06N 20/00 |
| 2021/0174164 | A1 * | 6/2021 | Hsieh | G06N 3/044 |
| 2022/0164868 | A1 * | 5/2022 | Dill | G06Q 40/02 |
| 2024/0362678 | A1 * | 10/2024 | Ahuja | G06Q 30/0261 |
| 2025/0156641 | A1 * | 5/2025 | Tang | G06Q 50/01 |

* cited by examiner

*Primary Examiner* — Meredith A Long
(74) *Attorney, Agent, or Firm* — STERNE, KESSLER, GOLDSTEIN & FOX P.L.L.C.

(57) ABSTRACT

Disclosed herein are system, method, and computer program product embodiments for using generative AI to support an upsell engine. A point-of-sale (POS) system may combine transaction data, merchant data, and consumer data into a shared embedding space comprising a numerical matrix. A machine learning model in connection with the POS system may generate an offer based on the shared embedding of the transaction data, consumer data, and merchant inventory data. The offer may be unique to the transaction. The POS system may prevent merchant data from being transmitted to a banking server, and may prevent consumer data from being transmitted to a merchant server. The POS system may output the offer.

20 Claims, 5 Drawing Sheets

GENERATIVE ARTIFICIAL INTELLIGENCE UPSELL ENGINE

BACKGROUND

Field

This field is generally related to increasing data security of systems interacting with a point of sale (POS) system using generative artificial intelligence (AI) to enable an upsell engine that maintains the privacy of information between the systems.

Related Art

Concerns surrounding data security and privacy are increasing given: (1) the increase in amount of data generated and stored; (2) the number of systems utilizing that data; and (3) the interconnectedness of those systems. For example, a merchant may inadvertently share a consumer's credit card or other banking information with a third party. Alternatively, a bank may experience a cyberattack, causing merchant and customer data to be leaked to nefarious third parties. In addition to security, there are also proprietary concerns regarding sharing data. An entity may spend significant resources and capital building a data set that accurately captures its products, services, customers, etc. For example, a financial institution that collects consumer data may not wish to share this data based on: (1) regulatory restrictions; and (2) the cost of creating the data set. However, the combination of data from different entities may be used to generate insights regarding likely successful products and expected consumer behavior. Thus, there is a need to increase the ability to securely share data, in real-time, between multiple parties.

BRIEF SUMMARY

Disclosed herein are system, apparatus, device, method and/or computer program product embodiments, and/or combinations and sub-combinations thereof, for using generative AI to support an upsell engine with limited transmission of customer and merchant data between components within a point of sale (POS) system. This disclosure describes a POS system that leverages a trained machine learning model to generate unique offers based on information provided by merchant systems (e.g., merchant proprietary information, shopping cart information), consumer devices (e.g., consumer information and/or behavior) and bank backend systems (e.g., bank transaction history). The POS system may leverage both banking information from bank backend systems and merchant information, while maintaining privacy and separation of bank and merchant information by limiting communications between the bank backend system and merchant system. The POS system may combine the relevant bank, merchant, and transaction data, input it to a trained machine learning model, and generate a custom offer. The custom offer may be provided to the consumer involved in the purchase. The POS system described herein improves network and data privacy by allowing merchant and bank information to be leveraged, without having to share it with untrusted parties.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
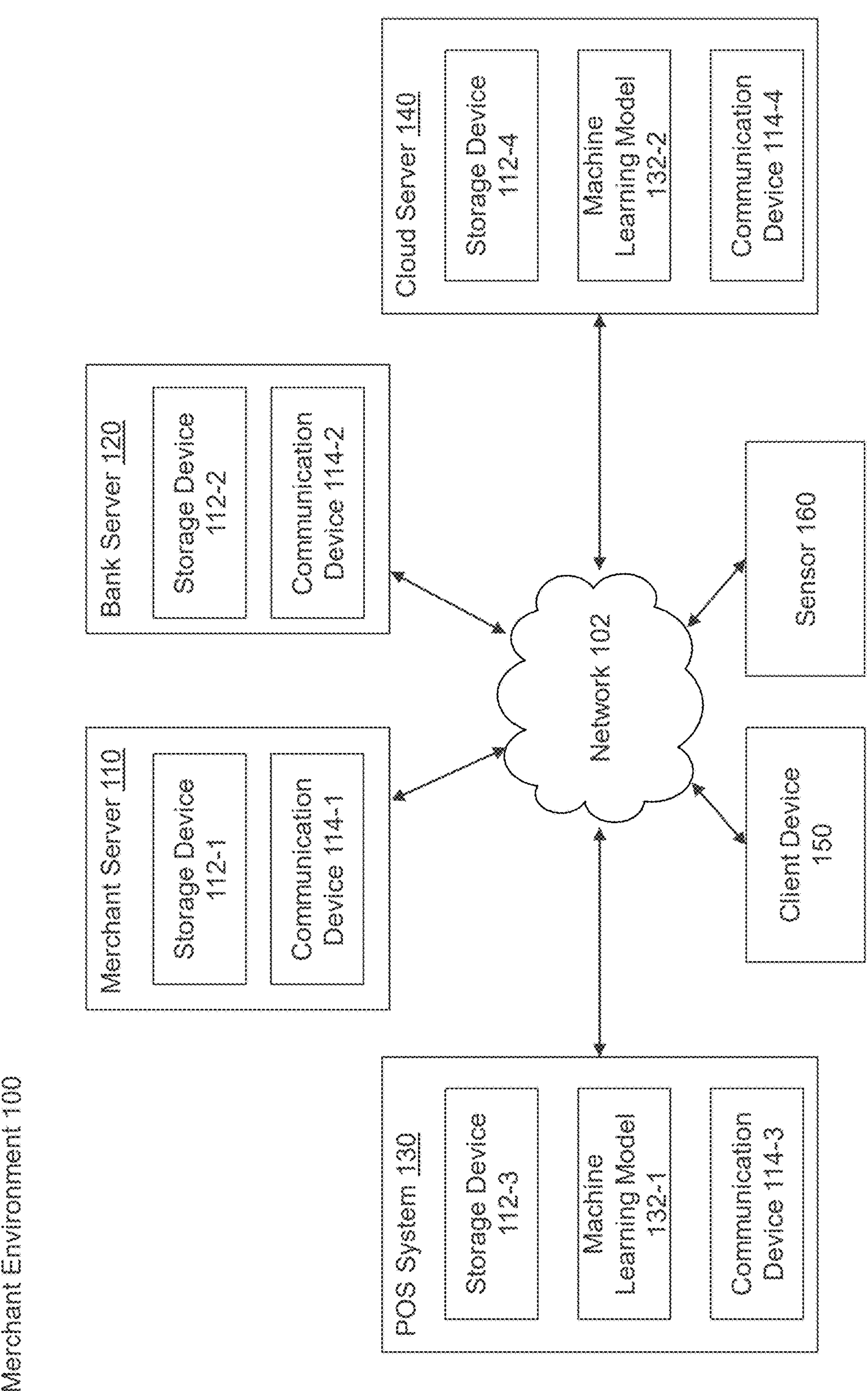
FIG. 1 depicts a block diagram of a merchant environment, according to some embodiments.

Provided herein are system, apparatus, device, method and/or computer program product embodiments, and/or combinations and sub-combinations thereof, for using generative artificial intelligence (AI) to enable an upsell engine. A machine learning model may be leveraged to predict real-time offers based on combined bank and merchant information while maintaining the privacy of bank and merchant information by limiting communications between these systems.

Merchants and banks may both generate and send offers to customers. For example, a bank that offers a credit card may provide offers to credit card users based off of various factors such as credit limit, credit utilization, and purchase history. Merchants may also generate and transmit offers to customers based off of loyalty programs, purchase history, and ongoing promotions. However, banking systems and merchant servers often distribute these offers without having access to data from the other party. For example, a bank may offer a 10% discount at a merchant to all credit card holders. However, an offer of this type fails to take into account the merchant's data.

As discussed above, a bank may not wish to share any consumer data with a merchant, resulting in a merchant being unable to understand their customers better. A merchant may not wish to share business data (e.g., inventory, profitability) with a bank, preventing the bank from creating offers using the merchant's current or predicted financial state. In addition to isolated data sets, merchant and bank offers are often generated after transactions occur. For example, a banking system may generate offers for a customer based off of their purchase history reflected in a credit card statement. Similarly, a merchant server may generate offers based off of purchases made by a customer at the merchant. For example, a merchant server may generate a coupon in response to a completed transaction However, generating offers based off of previous behavior primarily relies on reasoning that the customer will engage in the same behavior in the future. For example, a bank may determine that since a customer made a purchase at a particular grocery store, they're likely to shop there again. As a result, the bank may generate an offer for a discount on purchases made with the bank's credit card at the grocery store in the future. However, in some scenarios, the user may make a one-time purchase based off of extenuating scenarios. For example, the customer may be on vacation at a location where they're unlikely to return. Thus, generating offers based off of these purchases are unlikely to result in additional purchases because it's unlikely the customer will return to that location. Thus, there is a need to generate offers in real-time, while the customer is shopping or making a purchase, in order to maximize offer effectiveness.

The POS system described herein may be configured to securely combine bank and merchant data in order to generate real-time custom offers for the consumer while maintaining privacy of the data between each of the components in communication with the POS system. Since the POS system may be in communication with both the bank and merchant server in order to execute a transaction, this data may be further leveraged to generate real-time offers. The POS system may further be leveraged to prevent bank data from being transmitted to a merchant server, or vice versa.

Various embodiments of these features will now be discussed with respect to the corresponding figures.

FIG. 1 depicts a block diagram of a merchant environment 100, according to some embodiments. Merchant environment 100 includes network 102, merchant server 110, bank server 120, POS system 130, cloud server 140, client device 150, and sensor 160.

Network 102 may be any type of computer or telecommunications network capable of communicating data, for example, a local area network, a wide-area network (e.g., the Internet), or any combination thereof. The network may include wired and/or wireless segments. In some embodiments, network 102 may be a secure network.

Merchant server 110 may include storage device 112-1 and communication device 114-1. Merchant server 110 may be implemented using one or more servers and/or databases. In some embodiments, merchant server 110 may be implemented using a computing device such as a desktop workstation, laptop or notebook computer, netbook, tablet, smart phone, and/or other computing device. In some embodiments, merchant server 110 may be implemented as an application in an enterprise computing system and/or a cloud-computing system. In some embodiments, merchant server 110 may be a computer system such as computer system 500 described with reference to FIG. 5.

Communications device 114 may be configured to communicate with entities on network 102. Communications device 114 may comprise any suitable network interface capable of transmitting and receiving data, such as, for example a modem, an Ethernet card, a communications port, or the like. Communications device 114 may be able to transmit data using any wireless transmission standard such as, for example, Wi-Fi, Bluetooth, cellular, or any other suitable wireless transmission.

Storage device 112 may be implemented using a memory storage device. Storage device 112 may be used to store data. For example, storage device 112-1 at merchant server 110 may include merchant data. Merchant data may include, but is not limited to current inventory, expected inventory, historical inventory, transaction history, current pricing, historical pricing, merchant costs/expenses (e.g., procurement, employee salaries, employee benefits, rent/mortgage, taxes), current profit, projected profits, and historical profits. Merchant data may further include rules that limit the terms of available offers. Rules may relate to offer amounts, offer time limits (e.g., offer valid for 30 days), the number of times an offer may be used (e.g., one time use only), and items an offer may be used on. Merchant server 110 may be configured to send merchant data to POS system 130 and cloud server 140.

Offer amount rules may include maximum and/or minimum dollar amounts for offers. For example, a rule may specify a minimum spend amount (e.g., $10) for an offer to be redeemed (e.g., 10% off the purchase price). Similarly, a rule may specify a maximum offer amount. For example, an offer for 10% cashback may include a rule that the cashback amount cannot exceed $100. In some embodiments, dollar amounts may be reflected as discount percentage. For example, merchant server 110 may include a rule that an offer cannot include a discount that exceeds 70%.

Bank server 120 may include storage device 112-2 and communication device 114-2. Bank server 120 may be implemented using one or more servers and/or databases. In some embodiments, bank server 120 may be implemented using a computing device such as a desktop workstation, laptop or notebook computer, netbook, tablet, smart phone, and/or other computing device. In some embodiments, bank server 120 may be implemented as an application in an enterprise computing system and/or a cloud-computing system. In some embodiments, bank server 120 may be a computer system such as computer system 500 described with reference to FIG. 5.

As stated above, storage device 112 may be implemented using a memory storage device to store data. Storage device 112-2 at bank server 120 may include consumer data, including but not limited to, consumer transactions (e.g., purchases, returns), credit score, account balance, and consumer interactions with bank server 120. Consumer data may further include personally identifiable information such as a name, social security number, driver's license number, passport number, credit card number, debit card number, address, address history, age, and gender. Consumer data may occupation, salary, occupation history, and education history. Consumer data may further include rules that limit available offers. Rules may relate to offer amounts, offer time limits, and the number of times an offer may be used. In some embodiments, rules may apply to all consumer whose data is stored at bank server 120. For example, a rule requiring all discounts to be less than $10,000 may apply to all consumers. Bank server 120 may include rules that apply to consumers meeting certain conditions. For example, a rule may indicate a discount cannot exceed 50% of a consumer's credit card limit. For example, if a consumer's credit card limit is $10,000, bank server 120 may include a rule that the consumer cannot receive a discount greater than $5,000.

Similar to the rules described with respect to merchant server 110, bank server 120 may also include offer amount rules may include maximum and/or minimum dollar amounts for offers. In some embodiments, offer amount rules may be defined as dollar amounts. In some embodiments, dollar amounts may be reflected as discount percentage. For example, bank server 120 may define that an offer cannot include a discount that exceeds 70% of the purchase price. As an additional example, bank server 120 may define a rule that a discount cannot exceed $1,000.

Bank server 120 may be configured to send transaction approval messages to POS system 130 and cloud server 140. A transaction approval message may include a price, an item, and consumer data described above.

POS system 130 may be a system to facilitate a transaction. POS system 130 may be located within a merchant location (e.g., a store). POS system may include storage device 112-3, communication device 114-3, and machine learning model 132-1. Storage device 112-3 may be a memory device to store data received from entities on network 102 such as from merchant server 110 and bank server 120. As will be discussed below, machine learning model 132-1 may be used to predict offers in real time. POS system 130 may include communication device 114-3 to communicate with entities on network 102. A consumer may use POS system 130 to make a purchase. For example, a consumer may scan one or more items and input a payment method such as a credit card or debit card. POS system 130 may communicate with merchant server 110 in order to obtain a price, name, and/or identifier (e.g., stock keeping unit) of a scanned item.

POS system 130 may generate and send a transaction request message to a server such as bank server 120 to approve the transaction. The transaction request message may include payment method information (e.g., credit card number), a price, and the item(s) to be purchased. POS system 130 may receive an approval or denial response from bank server 120.

In some embodiments, POS system 130 may query merchant server 110 and bank server 120 for information in order to generate an offer. As stated above, merchants and banks may not wish to allow the other entity access to their data because of legal, privacy, and proprietary concerns. However, both of these entities may already share some information with a POS system, such as POS system 130 when a typical transaction occurs. Additionally, POS system 130 may be configured to prevent merchant data from being transmitted to bank server 120. Similarly, POS system 130 may be configured to prevent consumer data from being transmitted to merchant server 110. Therefore, using POS system 130 as a trusted intermediary to leverage the combination of both merchant and bank information may be valuable to generate real-time unique offers in response to transactions.

In some embodiments, POS system 130 may request information from merchant server 110 and bank server 120 to generate the offer. For example, POS system 130 may request information from merchant server 110 and bank server 120 when a consumer scans a first item. In some embodiments, POS system 130 may request information from merchant server 110 and bank server 120 once the transaction has been approved by a server such as bank server 120. By requesting data, security and privacy within merchant environment 100 is improved since merchant server 110 and bank server 120 may review received requests prior to sending data. For example, merchant server 110 and/or bank server 120 may consider the time of the request, a location the request originated from (e.g., POS system's 130 location), a reason for the request, and the merchant associated with POS system 130. Additionally, merchant server 110 and bank server 120 may decide what data to send. For example, bank server 120 may only send consumer data relating the consumer involved in the transaction.

POS system 130 may use machine learning model 132-1 to generate an offer for the consumer. Machine learning model 132 may be a machine learning model trained to generate offers based on data from merchant server 110 and bank server 120. Machine learning model 132 may be structured according to any architecture. Machine learning model 132 may be a support vector machine, multi-layer perceptron, neural network, convolutional neural network, recurrent neural network, or large language model. For example, machine learning model 132 may be built using a transformer architecture. POS system 130 may include machine learning model 132-1. Cloud server 140 may include machine learning model 132-2. Although POS system 130 and cloud server 140 are depicted as each including a single machine learning model 132, POS system 130 and cloud server 140 may include any number of machine learning models 132-1 and 132-2.

Machine learning model 132 may input: (1) transaction data including an item and a corresponding price; (2) consumer data from bank server 120; and (3) merchant data from merchant server 110. As discussed above, consumer data and merchant data may each include rules associated with bank server 120 and merchant server 110, respectively. Once input, machine learning model 132 may predict an offer that the consumer is most likely to engage with and that complies with merchant server's 110 and bank server's 120 rules. The offer may be a discount (e.g., $10 off a product, 10% off a product), an incentive (e.g., receive $20 rebate when you spend $100 at merchant X), or a combination thereof. The offer may apply to a single item (e.g., a specific laptop model) or a class of items (e.g., all laptop computers). The offer may have a time limit identifying a time window when the offer may be used. For example, the offer may only be used within 30 days of being generated. The offer may have a limited number of uses. For example, the offer may only be used once.

In some embodiments, machine learning model 132 may predict multiple offers. Each offer may have a probability score corresponding to machine learning model's 132 confidence that the respective offer will be utilized by the consumer. For example, machine learning model 132 may predict three offers: (1) $10 off coupon at merchant X; (2) $20 off when you spend $100 at Merchant X; and (3) 10% off at merchant X. Each offer may have a corresponding respective confidence score of: (1) 80%; (2) 15%; and (3) 5%. Since offer (1) has the highest probability, machine learning model 132 may output offer (1).

Machine learning model 132 may be trained by inputting: (1) transaction data including an item and a corresponding price; (2) consumer data from bank server 120; and (3) merchant data from merchant server 110. In response, machine learning model 132 may predict an offer to present to the consumer based on the input. The output offer may be compared to a label. The label may be an offer that a consumer accepted given similar transaction, consumer, and merchant data. An error may be calculated based off of the difference between the output offer and the label. In some embodiments, machine learning model 132 may use back-propagation to update based on the error.

In order to maintain privacy, machine learning model 132 may train using anonymized data. Machine learning model 132 may train on consumer profile data that has been altered to remove PII. As stated above, PII may include a name, social security number, driver's license number, passport number, credit card number, debit card number, and address. For example, a consumer's name within a consumer profile may be changed. In some embodiments, anonymization may be configured to limit the scope of certain changes. For example, a consumer's occupation or salary may have an impact on the type of offer predicted. Machine learning model 132 may predict offers with larger base prices (e.g., 10% off a $1,000 purchase) for consumer paid $1 million per year compared to a consumer paid $60,000 per year. Consumer spending data may indicate, and machine learning model 132 may learn that consumers with higher salaries may be more willing to spend, and therefore able to take advantage of offers with higher base prices. Here, the occupation or salary may not be modified so that machine learning model 132 may capture the relationship between occupation or salary, and whether the offer was accepted.

In some embodiments, machine learning model 132 may be stored in conjunction with a training data set. The training data set may be built using data from merchant server 110, bank server 120, or a combination thereof. In some embodiments, merchant server 110 and/or bank server 120 may send anonymized data sets to the system housing machine learning model 132 (e.g., POS system 130, cloud server 140) for training. In some embodiments, the system housing machine learning model 132 may perform anonymization. For example, bank server 120 may send data set including one or more consumer profiles to POS system 130. POS system 130 may edit each of the one or more consumer profiles to remove PII and then store the edited consumer profiles.

For example, POS system 130 may receive a first set of consumer data. The consumer data may include corresponding offers and labels indicating whether the consumer identified in the consumer data used the offer. As stated above, consumer data may include demographic and spending data. The offers may include: (1) 10% by spending $1,000; (2) 1% by spending $100; and (3) 20% off by spending $5,000. For each profile within the consumer data, each offer may have a label indicating whether the consumer identified by the consumer data used the offer. The labels may be binary (e.g. 0/1, T/F, yes/no).

In some embodiments, POS system 130 or cloud server 140 may build training data sets by anonymizing and saving data related to a consumer executing a transaction. As stated above, a consumer may execute a transaction at POS system 130. POS system 130 may request merchant data from merchant server 110. POS system 130 may also request consumer data from bank server 120 corresponding to the consumer in order to generate an offer the consumer is likely to accept. POS system 130 may then use the transaction data, consumer data, and merchant data to predict an offer. POS system 130 may receive a response to the offer.

In some embodiments, the predicted offer may be configured such that the consumer may accept or deny the offer at the moment of the transaction. Machine learning model 132-1 may predict an offer for redemption in real-time. For example, the offer may state that the consumer can receive 10% off their purchase if they also purchase an additional item, but that the offer is only valid for the present transaction. Subsequently, POS system 130 may save the transaction data, consumer data, merchant data, predicted offer, and consumer response (e.g., whether they purchased an additional item) for future training. In some embodiments, POS system 130 may anonymize the consumer data by removing PII prior to storing it.

In some embodiments, offers may have longer time windows. For example, a predicted offer may state that a consumer may receive 10% off purchases of item X at the merchant over the next 30 days. Here, POS system 130 may store the transaction data, consumer data, merchant data, and predicted offer at storage device 112-3. Subsequently, POS system 130 may update the stored data if, over the next 30 days, the consumer uses the predicted offer. If the consumer uses the predicted offer, POS system 130 may generate and store a label (e.g., 1, true) in association with the transaction data, consumer data, merchant data, and predicted offer. If the predicted offer expires or the consumer does not otherwise use the offer, POS system 130 may generate and store a label (e.g., 0, false) in association with the transaction data, consumer data, merchant data, and predicted offer. As a result, POS system 130 may construct a training data set over time.

Building a training data set at POS system 130 has numerous advantages. First, since the consumer is executing a transaction at the merchant where POS system 130 is located, training machine learning model 132 using that consumer's data will likely lead to more offer acceptances than using consumer data corresponding to consumers that don't shop where POS system 130 is located. Second, the data set can be constructed, and training may occur in real time. Consumer spending habits and financial situations may rapidly change. Thus, there is a need to maintain an accurate and current state of consumer habits. Capturing consumer data in real time, and subsequently using it to retrain machine learning model 132 ensures that machine learning model 132 has access to the latest and most accurate data, while also maintaining data privacy since data may be anonymized.

Once machine learning model 132-1 predicts an offer, POS system 130 may transmit the offer to merchant server 110 and banking server 120 for approval. The offer may be sent via network 102. In some embodiments, POS system 130 may send the consumer data received from bank server 120, back to bank server 120 in addition to the offer. Similarly, POS system 130 may send the merchant data from merchant server 110, back to merchant server 110 in addition to the offer. Transmitting the consumer data and merchant data to merchant server 110 and bank server 120 respectively may be beneficial so that each server may have the state information that was used to generate the offer. For example, given the real-time interactions occurring at network 102, consumer data at bank server 120 and merchant data at merchant server 110 may change during the course of a transaction. For example, during a transaction at POS system 130, the consumer may receive their paycheck, and therefore their account balance at bank server 120 may be different than when the consumer data was initially sent to POS system 130. Similarly, inventory or profit data at merchant server 110 may have changed during the transaction. It may also be beneficial to serve as an acknowledgement that each server (e.g., merchant server 110 and bank server 120) sent the correct data to POS system 130.

Merchant server 110 and bank server 120 may compare the offer against their respective rules. For example, merchant server 110 and/or bank server 120 may include rules defining: (1) a maximum allowable discount parameter (e.g., $1000 or 70%); (2) minimum spend amount to receive offer (e.g., 10% when you spend $1000); (3) whether an item or class of items in the offer is eligible for the offer; (4) whether the consumer identified in the offer is eligible for the offer; and (5) a time window during which the offer may be received (e.g., the next 30 days). Merchant server 110 and bank server 120 may respond to POS system 130 confirming or denying the offer. POS system 130 may output the offer if both merchant server 110 and bank server 120 approve the offer. In some embodiments, if either merchant server 110, bank server 120, or both, deny the offer, POS system 130 may use machine learning model 132-1 to generate a new offer and send it to merchant server 110 and bank server 120 for approval. POS system 130 may be configured to regenerate new offers a maximum number of times. As stated above, this process may occur in real-time, while a consumer is standing at POS system 130. Therefore, in order to avoid unnecessary delays, POS system 130 may stop generating offers after, for example, three offer generations.

POS system 130 may be configured to output offers generated by machine learning model 132-1. POS system 130 may output generated offers in various ways including, but not limited to, printing a physical coupon, email, text, or physical mail. In some embodiments, merchant associated with POS system 130 and merchant server 110 may have a corresponding application (e.g., a mobile app). Here, the discount may be sent to the mobile app associated with an account of the consumer. For example, POS system 130 may use communication device 114-3 to communicate the offer to the consumer. The offer may be communicated to a device associated with the consumer such as client device 150.

As will be discussed in more detail below, POS system 130 may generate a preliminary offer prior to receiving the transaction approval from banking server 120 or any other transaction clearinghouse. For example, POS system 130 may request merchant data from merchant server 110 and consumer data from bank server 120 when a first item is scanned or otherwise input at POS system 130. Subsequently, POS system 130 may use machine learning model 132-1 to generate a preliminary offer by inputting the received merchant data, consumer data, and the first item scanned. POS system 130 may use machine learning model 132-1 to update the preliminary offer as each subsequent item is scanned. POS system 130 may further use machine learning model 132-1 to update the preliminary offer if a scanned item is removed from the transaction. POS system 130 may provide the preliminary offer to the customer if they decline to make a purchase. For example, the customer may cancel a transaction at POS system 130, however, POS system 130 may still output the preliminary offer to the customer.

For example, a customer may scan a bag of potato chips at POS system 130. POS system 130 may request merchant data from merchant server 110 and consumer data from bank server 120. Once received, POS system 130 may input to machine learning model 132-1: (1) information regarding the bag of potato chips (e.g., price and item description); (2) the received merchant data; and (3) the received consumer data. Machine learning model 132-1 may generate a preliminary offer. A second item may be scanned, such as an apple. POS system 130 may input the same information as above, plus information regarding the apple, to machine learning model 132-1, to generate a second preliminary offer. As will be discussed below, preliminary offers may be communicated to a customer via client device 150. In some embodiments, the customer may provide feedback for the generated preliminary offers. The feedback may be sent from client device 150 to POS system 130. Machine learning model 132-1 may be further configured to input the feedback when generating preliminary offers. This process is beneficial to ensure that offers may be generated in real-time at POS system 130 without introducing any delay. In some embodiments, if the consumer cancels the transaction, POS system 130 may present the preliminary offer to the consumer. In some embodiments, the POS system 130 may discard the offer if the transaction is canceled.

POS system 130 may use machine learning model 132-1 to generate a final offer once the last item is input to POS system 130. For example, machine learning model 132 may predict a final offer once POS system 130 generates a transaction request, indicating the consumer has identified all items they wish to purchase. In some embodiments, POS system 130 may not predict a preliminary offer. For example, POS system 130 may use machine learning model 132-1 to predict an offer once a clearinghouse (e.g., bank server 120) has approved the transaction request.

Cloud server 140 may be a server configured to generate real-time offers in response to transactions. Cloud server may include storage device 112-4, communication device 114-4, and machine learning model 132-2. Although a single cloud server 140 is depicted, merchant environment 100 may include any number of cloud servers 140. Cloud server 140 may be implemented using one or more servers and/or databases. In some embodiments, cloud server 140 may be implemented using a computing device such as a desktop workstation, laptop or notebook computer, netbook, tablet, smart phone, and/or other computing device. In some embodiments, cloud server 140 may be implemented as an application in an enterprise computing system and/or a cloud-computing system. In some embodiments, cloud server 140 may be a computer system such as computer system 500 described with reference to FIG. 5.

Cloud server 140 may be used to remotely generate offers. In some embodiments, cloud server 140 may be leveraged to generate offers for a consumer making purchases or browsing products online. For example, cloud server 140 may be associated with an online retailer. When a user makes a purchase at the retailer associated with cloud server 140, cloud server 140 may leverage data from merchant server 110 and bank server 120 to generate a real-time unique offer. Similar to POS system 130, cloud server 140 may use machine learning model 132-2 to generate the offer.

In some embodiments, cloud server 140 may be leveraged for ensemble learning. Ensemble learning may utilize multiple machine learning models to generate a prediction. Here, machine learning model 132-1 at POS system 130 may predict an offer using transaction data, merchant server 110 data, and bank server 120 data. Additionally, POS system 130 may send the transaction data, merchant server 110 data, and bank server 120 data to cloud server 140 for analysis. Cloud server 140 may apply machine learning model 132-2 to generate a prediction, and return the prediction to POS system 130. POS system 130 may compare its generated offer to cloud server's 140 offer. If the offers are the same, POS system 130 may output the generated offer. In some embodiments, the offers may differ. When the offers differ, POS system 130 may output an average of the offers. For example, machine learning model 132-1 at POS system 130 may generate a 10% discount and machine learning model 132-2 at cloud server 140 may generate a 20% discount, here, POS system 130 may output a 15% discount based on the calculated average of the discounts. In some embodiments, POS system 130 may make a determination if the difference between the generated offers is greater than a predefined threshold.

POS system 130 may calculate a difference between the discounts. For example, POS system 130 may have generated an offer of $100 off a next purchase and cloud server 140 may have generated an offer for $50 off a next purchase. Here, POS system 130 may calculate a difference between the discounts and compare it to a threshold. For example, POS system 130 may use its discount if the offers are within $10, use the average if the offers are between $10.01-$100, or re-generate a new offer if the difference is greater than $100. POS system 130 may perform a similar operation for discounts indicated in percentages. For example, POS system 130 may use its discount if the offers differ by 10 percentage points, average the discounts if the offers differ by anywhere between 11-20 percentage points, and re-generate a new discount if the offers differ by greater than 20 percentage points.

Cloud server 140 may also be used to generate preliminary offers. As stated above, cloud server 140 may be used for online shopping. For example, a user may use client device 150 to interface with an online retailer associated with cloud server 140. The user may interact with client device 150 to identify items for purchase (e.g., adding an item to the cart). Each time the online cart is updated, cloud server 140 may leverage machine learning model 132-2 to generate a preliminary offer. For example, a preliminary offer may be generated when an item is added to the cart, removed from the cart, or when a quantity of an item is updated. Similar to the process described above, this may involve the merchant data, consumer data, and item data. Each time the online cart is updated (e.g., a product is added, a product quantity is changed, a product is removed) cloud server 140 may cause machine learning model 132-2 to create a new preliminary offer. In some embodiments, the preliminary offer may be displayed as a notification or alert on an interface at client device 150. In some embodiments, the preliminary offer may be automatically applied and updated at the online cart.

In some embodiments, cloud server 140 may be leveraged in a scenario where a merchant's POS system does not include machine learning model 132-1. For example, a merchant may wish to leverage machine learning model 132 to generate real-time custom offers, but their POS system may be unable to host machine learning model 132-1. In this example, the merchant may route data from their POS system to cloud server 140 for offer generation.

Client device 150 may be a device associated with a consumer interacting with entities within merchant environment 100. For example, client device 150 may be a smart phone owned by a consumer making a purchase at POS system 130. In some embodiments, client device 150 may be a computer used by a consumer making an online purchase via cloud server 140. Client device 150 may be a computer system such as computer system 500 described with reference to FIG. 5. Client device 150 may be a client system such as a desktop workstation, laptop or notebook computer, netbook, tablet, smart phone, and/or other computing device that may be using an enterprise computing system. Although merchant environment 100 depicts one client device 150, merchant environment 100 may include any number of client devices 150.

Client device 150 may be in communication with bank server 120. For example, client device 150 may belong to a customer of the bank affiliated with bank server 120. As discussed above, bank server 120 may forward customer data to POS system 130 and/or cloud server 140 during a transaction. In some embodiments, bank server 120 may request permission from the customer prior to forwarding the data. For example, client device 150 may access an account at bank server 120 and authorize bank server 120 to send account data to POS system 130 and/or cloud server 140. In some embodiments, client device 150 may include a software application associated with bank server 120. Client device 150 may receive a notification from the software application to authorize bank server 120 to send customer data to POS system 130 and/or cloud server 140. In some embodiments, the software application may include a setting where a user may toggle bank server's 120 ability to send customer data to POS system 130 and/or cloud server 140.

Sensor 160 may be any device configured to gather data from an environment. Sensor 160 may be, but is not limited to, a camera, microphone, motion sensor, pressure sensors, GPS, RFID sensor, and a proximity sensor. Although a single sensor 160 is depicted, merchant environment 100 may include any number of sensors 160. For example, a merchant store may deploy one or more cameras (e.g., sensors 160) to monitor the store. In some embodiments, a store may use motion and pressure sensors to monitor products that are interacted with and for how long. RFID tags may be attached to items such as carts or baskets in order to track movement throughout the store. This may be used to map traffic density throughout a store.

In some embodiments, client device 150 may allow sensor 160 to gather data. In some embodiments, client device 150 may include a software application associated with the merchant. The software application may detect that client device 150 is located at a merchant location (e.g., a store). This may be accomplished via any geolocation technology such as WiFi geolocation, GPS, cellular signal triangulation, a beacon system, or a combination thereof. The software application may request access to geolocation data at client device 150. For example, the software application may leverage a GPS receiver in client device 150 to determine that client device 150 is at a location associated with the merchant. As an additional example, the software application on client device 150 may detect a WiFi, RFID, NFC, and/or Bluetooth signature associated with the merchant to determine that client device 150 is located at the merchant's location. In response to being provided location data, software application may generate a prompt or notification at client device 150 to authorize tracking by sensor 160 within the store. The notification may include a list of sensors 160 at the store, allowing the user to toggle tracking by each sensor 160 at the store. The response (e.g., approval or rejection) may be forwarded to merchant server 110 and/or POS system 130, and then to sensor 160. If approved, sensor 160 may track client device 150 and an associated user.

In some embodiments, sensor 160 may recognize a user of client device 150, and cause a prompt or notification at client device 150 requesting tracking permission. For example, a camera (e.g., sensor 160) may send a photo of each customer entering a store affiliated with merchant server 110. The photos may be routed to merchant server 110 for identification. If merchant server 110 identifies a customer based off sensor 160 data, merchant server 110 may send a notification to an identifier associated with the customer. The identifier may be a phone number, email address, or software application identifier. The notification may be displayed on client device 150. Similar to the embodiment above, the notification may include a list of sensors 160 at the store, allowing the user to toggle tracking by each sensor 160 at the store.

For example, merchant server 110 may send a list of sensor(s) 160 located at the merchant location to the software application at client device 150. A user may be able to toggle whether the displayed sensors 160 may track the user. For example, a user may enter store associated with merchant server 110. The user may have a smart phone (e.g., client device 150) with a software application installed on the smart phone. The software application may be affiliated with merchant server 110 and/or bank server 120. The software application may check client device's 150 location, and determine client device 150 is at a store affiliated with merchant server 110. The software application may send, via client device 150, a request to merchant server 110 for sensors 160 at the location. Merchant server 110 may respond with a list of one or more sensors 160 at the location. The software application may display a notification listing the one or more sensors 160. A user may interact with client device 150 to toggle whether each of the one more sensors 160 may track them. The software application may communicate the selections, via client device 150, to merchant server 110 and/or POS system 130. Merchant server 110 and/or POS system 130 may then communicate with the one or more sensors 160, designating whether each of them may track the user associated with client device 150. In some embodiments, a user may update the selection. For example, the user may interact with the notification to allow a first selection of one or more sensors 160 to track the user. Subsequently, the user may activate the software application at client device 150 and allow a second selection of one or more sensors 160 to track the user.

Sensor 160 may transmit sensor data in real-time. For example, sensor 160 may transmit real-time data to merchant server 110. In response, merchant server 110 may send the data from sensor 160 to POS system 130 and/or cloud server 140 for real-time offer generation. In some embodiments, sensor 160 may transmit data in real-time directly to POS system 130 and/or cloud server 140. In some embodiments sensor 160 data may be used to generate preliminary offers. Generating preliminary offers may occur prior to a consumer associated with client device 150 making a purchase. For example, POS system 130 may receive a first sensor data, the first sensor data comprising an item the consumer interacted with. POS system 130 may then generate a preliminary offer via machine learning model 132-1 using the first sensor data and merchant inventory data. The merchant inventory data may be from merchant server 110. POS system 130 may then receive a second sensor data from sensor 160. POS system 130 may then update the preliminary offer via machine learning model 132 using the first sensor data, second sensor data, and merchant inventory data.

For example, a camera (e.g., sensor 160) may track a user looking at boxes of cereal, picking up a first box of cereal, inspecting it, and placing it back down. Sensor 160 may send this data to POS system 130. POS system 130 may use data from merchant server 110, and sensor 160 data to generate preliminary offer. The preliminary offer may be updated once the consumer arrives at POS system 130. For example, the consumer may eventually arrive at POS system 130 without the cereal. POS system 130 may request consumer data from bank server 120, and predict a new offer using transaction data, bank server 120 data, merchant server 110 data, and sensor 160 data.

As stated above, a user of client device 150 may be recognized and allow sensor 160 to track them. The user may further allow, via a software application at client device 150, their consumer data from bank server 120 to be transmitted to POS system 130. Here, data from sensor 160, merchant server 110, and bank server 120, may be combined at POS system 130 and/or cloud server 140 to predict real-time preliminary offers as the user moves throughout the store. For example, a GPS receiver at client device 150, NFC sensors, RFID sensors and/or Bluetooth beacons may track the consumer's location as they move throughout the store. This location data may be transmitted to POS system 130 via client device 150. POS system 130 may include an internal map of the store including the location of objects within the store. In addition to merchant data and consumer data, machine learning model 132 may input the amount of time the consumer spends at each product area within the store when generating an offer. In some embodiments, the predicted preliminary offers may be continuously transmitted to client device 150. For example, POS system 130 and/or cloud server 140 may send an available preliminary offer to client device 150 at a predefined interval (e.g., every 30 seconds, every minute, or every two minutes). In some embodiments, POS system 130 and/or cloud server 140 may communicate with client device 150 each time a new preliminary offer is generated, or an existing preliminary offer is updated. For example, each time a new preliminary offer is generated or each time a preliminary offer is updated, POS system 130 and/or cloud server 140 may transmit the new or updated preliminary offer to client device 150. This may be beneficial for the user to determine current offers available to them.

In some embodiments, the consumer may submit feedback regarding the preliminary offers. As discussed above, if the user of client device 150 consented to tracking and preliminary offer generation, POS system 130 may predict preliminary offers and transmit them to client device 150. In some embodiments, a notification showing the preliminary offer may display at client device 150. The user may be able to interact with the preliminary offer to submit feedback. For example, the user may click a thumbs up or thumbs down button indicating satisfaction or dissatisfaction with the preliminary offer. In some embodiments, the user may select a number between 1 and 10 indicating how likely they would be to use or engage with the preliminary offer. Client device 150 may send the feedback to POS system 130 via network 102. POS system 130 may incorporate the feedback into offer generation. For example, POS system 130 may further input the feedback into machine learning model 132-1. Machine learning model 132-1 may be further trained to use feedback for offer generation. For example, machine learning model 132-1 may predict a first preliminary offer. The first preliminary offer may be transmitted to client device 150 by POS system 130. POS system 130 may receive feedback from a user of client device 150. Machine learning model 132-2 may predict a second preliminary offer, based on at least the feedback. For example, if the feedback is positive, machine learning model 132-1 may be trained to predict a similar offer. In contrast, if the feedback is negative, machine learning model 132-1 may be trained to predict a dissimilar offer.

A final offer may be predicted once the consumer causes POS system 130 to send a transaction approval request.

Including data from sensor 160 allows machine learning model 132 to consider real-time data that may not be available at merchant server 110 and/or bank server 120. For example, machine learning model 132-1 may include data from sensor 160 capturing the consumer interacting with the cereal when generating the offer. As a result, the predicted offer may include a discount associated with the cereal interacted with, or the offer may be for the other products that: (1) are made by the same manufacturer; (2) that bank server 120 determines the consumer has previously purchased and are similar; and (3) related products that merchant server 110 indicates are in stock. This feature allows for offers to be generated in real-time using data unavailable to current systems. By leveraging sensor 160 data as well as merchant server 110 and bank server 120 data, offers may be tailored to a specific consumer's transaction history, a merchant's current inventory, and the consumer's live actions within a store.

Data from sensor 160 may be used to train machine learning model 132. For example, video data from sensor 160 may include customer interactions with products, and whether the customer accepted an offer subsequently generated by POS system 130 and/or cloud server 140. Sensor 160 data may be combined with other data for training. For example, data from sensor 160 may be combined with transaction data, merchant data, and consumer data. To be combined, the data may be transformed into a shared embedding space. This may be accomplished via any embedding algorithm such as BERT or word2vec. Once transformed, the data may be aggregated into a numerical matrix and input to a machine learning model such as machine learning model 132-1.

Figure 2:
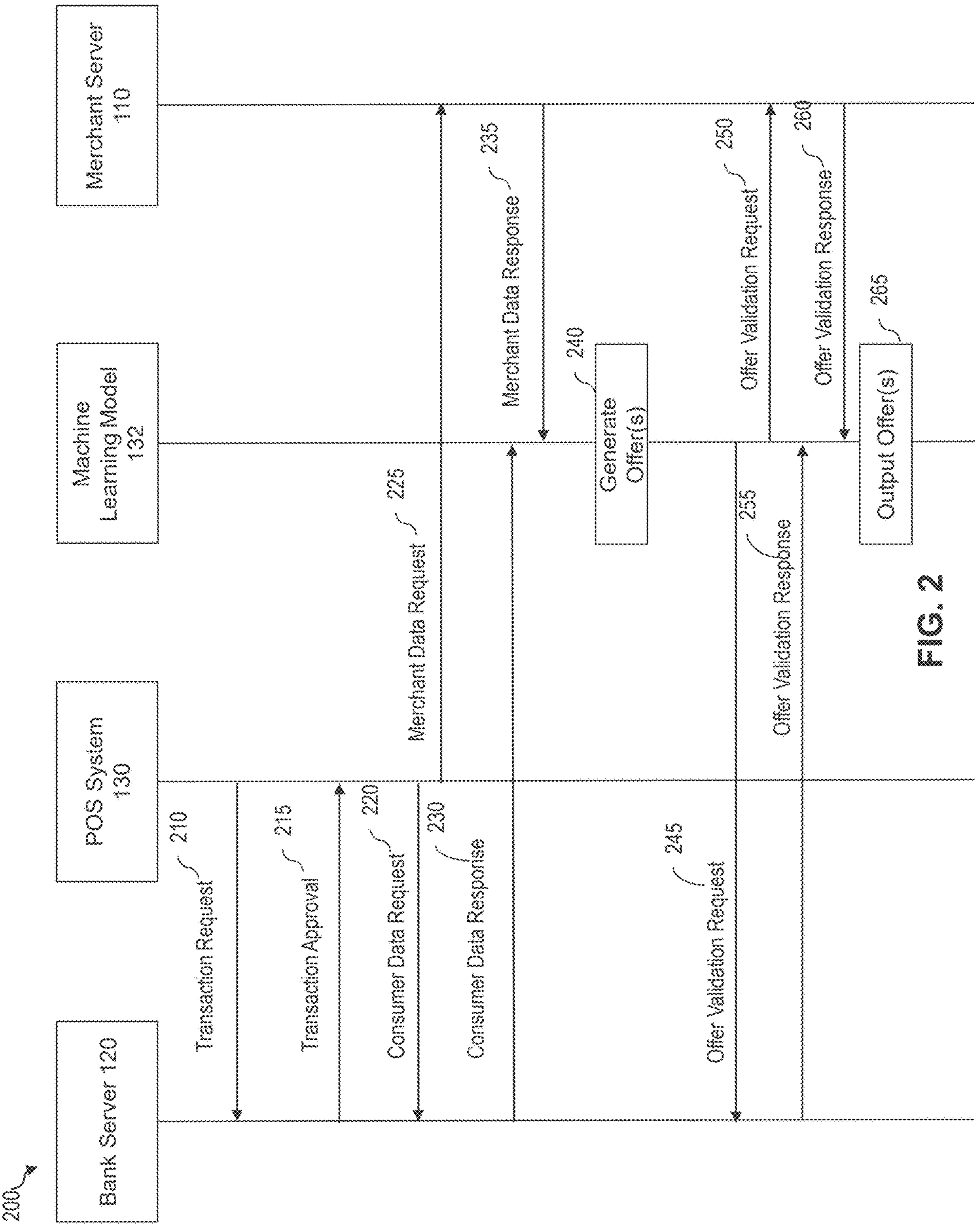
FIG. 2 depicts a block diagram illustrating a method for utilizing AI for real-time unique offer generation, according to some embodiments.

FIG. 2 depicts a block diagram illustrating a method 200 for utilizing AI for real-time unique offer generation, according to some embodiments. Method 200 shall be described with reference to FIG. 1, however, method 200 is not limited to that example embodiment.

In an embodiment, POS system 130 may utilize method 200 combine transaction data, consumer data, and merchant data to generate a real-time unique offer. The foregoing description will describe an embodiment of the execution of method 200 with respect to POS system 130. While method 200 is described with reference to POS system 130, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Method 200 may be executed using cloud server 140 instead of POS system 130. Machine learning model 132 may be machine learning model 132-1 at POS system 130, or machine learning model 132-2 at cloud server 140.

It is to be appreciated that not all steps may be needed to perform the disclosure provided herein. Further, some of the steps may be performed simultaneously, or in a different order than shown in FIG. 2.

At 210, POS system 130 generates and sends a transaction request via network 102. The transaction request may be sent to bank server 120. The transaction request may include payment method information (e.g., credit card number), a price, and the items to be purchased. In some embodiments, the transaction request may further include a transaction ID, message ID, or other identifier to identify the transaction.

At 215, POS system 130 receives a transaction approval message. The transaction approval message may be sent by bank server 120 via network 102. The transaction approval message may include a transaction ID, message ID, or other identifier to identify the transaction and match the identifier in the transaction request.

At 220, POS system 130 sends a consumer data request via network 102. The consumer data request may be sent to bank server 120.

At 225, POS system 130 sends a merchant data request via network 102. The merchant data request may be sent to merchant server 110.

At 230, machine learning model 132 receives a consumer data response via network 102. The consumer data response may be from bank server 120. As noted above, machine learning model 132 may be machine learning model 132-1 at POS system 130. In some embodiments, bank server 120 may first send the consumer data to POS system 130, and POS system 130 may forward the consumer data to machine learning model 132-1. Similarly, machine learning model 132 may be machine learning model 132-2 at cloud server 140. In some embodiments, bank server 120 may first send the consumer data to cloud server 140, and cloud server 140 may forward the consumer data to machine learning model 132-2. In some embodiments, bank server 120 may send the consumer data to both machine learning model 132-1 at POS system 130 and machine learning model 132-2 at cloud server 140. This is beneficial because it allows for offers to be generated via ensemble learning, whereby multiple models are utilized to generate predictions, and then the predictions are consolidated into a final output. In other embodiments, POS system 130 may not be configured to house machine learning model 132. Here, bank server 120 may send the consumer data to a cloud based machine learning model, such as machine learning model 132-2 at cloud server 140.

Bank server 120 may identify the consumer data via the payment method. For example, bank server 120 may use a credit card number included in the transaction request to identify the consumer data. The consumer data may include consumer transactions (e.g., purchases, returns), credit score, account balance, and consumer interactions with bank server 120. Consumer data may further include personal data such as name, address and address history, age, gender, occupation and occupation history, and education history. Consumer data may further include rules that limit available offers.

At 235, machine learning model 132 receives a merchant data response via network 102. The merchant data response may be from merchant server 110. As noted above, machine learning model 132 may be machine learning model 132-1 at POS system 130. In some embodiments, merchant server 110 may first send the consumer data to POS system 130, and POS system 130 may forward the consumer data to machine learning model 132-1. Similarly, machine learning model 132 may be machine learning model 132-2 at cloud server 140. In some embodiments, merchant server 110 may first send the consumer data to cloud server 140, and cloud server 140 may forward the consumer data to machine learning model 132-2. As noted above, in some embodiments, merchant server 110 may send the merchant data to both machine learning model 132-1 at POS system 130 and machine learning model 132-2 at cloud server 140. Noted above, POS system 130 may not be configured to house machine learning model 132. Here, bank server 120 may send the consumer data to a cloud based machine learning model, such as machine learning model 132-2 at cloud server 140.

The merchant data may include current inventory, expected inventory, transaction history, pricing, merchant costs/expenses (e.g., procurement, employee salaries, employee benefits, rent/mortgage, taxes), and profit. The merchant data may further include rules that limit available offers.

At 240, machine learning model 132 generates an offer. In some embodiments, machine learning model 132 may generate multiple offers, each having a corresponding probability score corresponding to the machine learning model's 132 confidence that the offer is correct given the inputs. The inputs may include: (1) transaction details including the item(s) purchased and price; (2) consumer data; and (3) merchant data. In some embodiments, the inputs may further include data from sensor 160 such as image, video, audio, and location data.

At 245, machine learning model 132 sends an offer validation request via network 102. The request may be sent to bank server 120. Noted above, machine learning model 132 may predict multiple offers each assigned a probability score. Here, machine learning model 132 may transmit the offer corresponding to the highest probability score. In some embodiments, machine learning model 132 may be located at POS system 130. As a result, machine learning model 132 may use POS system 132 to send the validation request. For example, POS system 130 may send the validation request via communication device 114-3. Similarly, machine learning model 132 may be located at cloud server 140. As a result, machine learning model 132 may use cloud server 140 to send the validation request. For example, cloud server 140 may send the validation request via communication device 114-4.

At 250, machine learning model 132 sends an offer validation request. The request may be sent to merchant server 110 via network 102. As noted above, machine learning model 132 may use POS system 130 and/or cloud server 140 to send the offer validation request to merchant server 110. Machine learning model 132 may transmit the offer having the highest probability score.

At 255, machine learning model 132 receives an offer validation response from bank server 120 via network 102. As discussed above bank server 120 may apply one or more rules or policies to determine whether to allow the offer to be given. For example, bank server 120 may have a policy defining a maximum discount amount (e.g., dollars, percentage of total price). Although rules associated with bank server 120 may be input to machine learning model 132 along with the consumer data, it may be beneficial to allow bank server 120 to also apply its rules. For example, bank server 120 may have updated its offer rules since the old rules were sent as part of the consumer data. As a result, bank server 120 may apply its updated set of offer rules. In some embodiments, machine learning model 132 may receive the offer validation response from bank server 120 via POS system 130 and/or cloud server 140.

At 260, machine learning model 132 receives an offer validation response from [0082] merchant server 110 via network 102. As discussed above, merchant server 110 may apply one or more rules or policies to determine whether to allow the offer to be given. For example, merchant server 110 may not allow discounts on certain items or classes of items. Similar to 255 above, merchant server 110 rules may be sent as part of the merchant data. However, merchant server 110 may have an updated set of offer rules since the merchant data was sent to POS system 130. In some embodiments, machine learning model 132 may receive the offer validation response from merchant server 110 via POS system 130 and/or cloud server 140.

At 265, machine learning model 132 may output the offer. Noted above, machine learning model 132 may be machine learning model 132-1 at POS system 130. As a result, machine learning model 132-1 may leverage POS system 130 to output the offer. For example, POS system 130 may print a coupon including the offer generated by machine learning model 132. In some embodiments, POS system 130 may transmit the offer to the consumer. For example, POS system 130 may transmit the offer to client device 150 of the consumer via network 102. For example, POS system 130 may be configured to: send an email to an email account of the consumer, send an SMS message to a phone number of the consumer, and send a notification to a software application (e.g., a mobile application) at client device 150 of the consumer. Similarly, machine learning model 132 may leverage cloud server 140 to output the offer. Here, cloud server 140 may transmit the offer to client device 150 via email, SMS, and/or a notification within a software application (e.g., a mobile application).

In some embodiments, if either merchant server 110, bank server 120, or both, deny the generated offer, POS system 130 may submit one of the additional offers generated by machine learning model 132. For example, POS system 130 may initially attempt to validate the offer with the highest probability score generated by machine learning model 132. If the offer is declined by merchant server 110, bank server 120, or both, POS system 130 may attempt to validate the offer with the next highest probability score. In some embodiments, POS system 130 may query machine learning model 132 to generate a new offer. In some embodiments, POS system 130 may send the transaction, consumer, and merchant data, along with machine learning model's 132-1 predicted offers to cloud server 140. Here, cloud server 140 may leverage machine learning model 132-2 to predict an offer and submit it to POS system 130 for comparison.

Although method 200 is described with respect to POS system 130, method 200 may be used with cloud server 140. For example, method 200 may be used with respect to an online transaction involving cloud server 140, instead of POS system 130.

Figure 3:
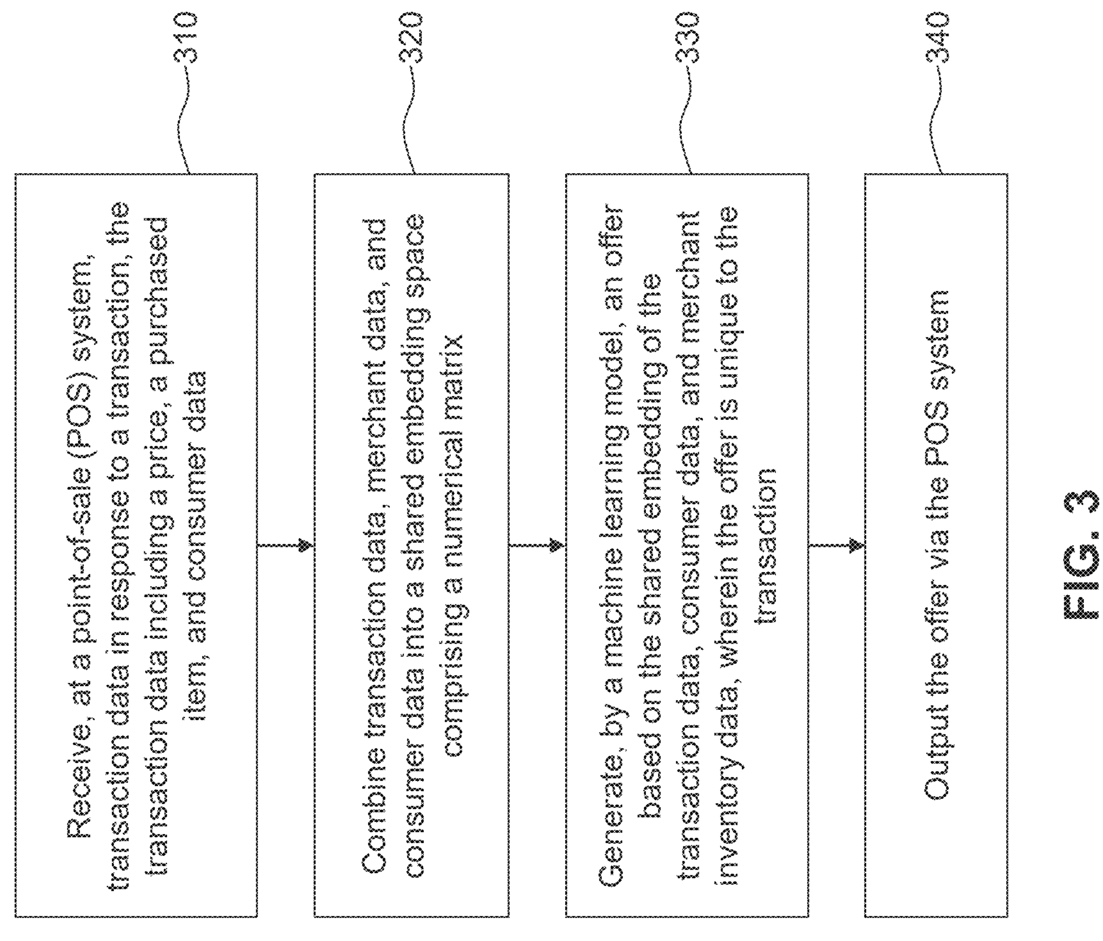
FIG. 3 depicts a flowchart illustrating a method for utilizing AI for real-time unique offer generation, according to some embodiments.

FIG. 3 depicts a flowchart illustrating a method 300 for utilizing AI for real-time unique offer generation, according to some embodiments. Method 300 shall be described with reference to FIG. 1, however, method 300 is not limited to that example embodiment.

In an embodiment, POS system 130 may utilize method 300 to combine transaction data, consumer data, and merchant data to generate a real-time unique offer. The foregoing description will describe an embodiment of the execution of method 300 with respect to POS system 130. While method 300 is described with reference to POS system 130, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Method 300 may be executed using cloud server 140.

It is to be appreciated that not all steps may be needed to perform the disclosure provided herein. Further, some of the steps may be performed simultaneously, or in a different order than shown in FIG. 3.

At 310, POS system 130 receives transaction data in response to a transaction, the transaction data including a price, a purchased item, and consumer data. The transaction data may be received from bank server 120 approving the transaction. The consumer data may be data stored by bank server 120 about a consumer involved in the transaction. For example, the consumer may have a credit card managed by bank server 120, and the credit card may have been used in the transaction. Consumer data may include consumer transactions (e.g., purchases, returns), credit score, account balance, consumer interactions with bank server 120, personal data such as name, address and address history, age, gender, occupation and occupation history, and education history, and rules or policies that limit available offers.

At 320, POS system 130 combines the transaction data, merchant data, and consumer data into a shared embedding space. The shared embedding space may be a numerical matrix. Merchant data may be received from merchant server 110, and may include, but is not limited to inventory, offer parameters, and offer policies. To create the shared embedding space, POS system 130 may convert the transaction data, merchant data, and consumer data into one or more numerical vectors. In some embodiments, POS system 130 may further include and convert data from sensor 160 into a numerical vector. The conversion may be configured to maintain the semantic meaning of the underlying data. For example, the items listed in the merchant data inventory that are similar (e.g., laptop computer and desktop computer) should have more similar vector representations than dissimilar items (e.g., laptop computer and car). POS system 130 may use algorithms such as BERT, word2vec, or any suitable algorithm to create the embedding representation.

Creating a shared embedding space has numerous technological benefits. First, it allows machine learning model 132 to generate a prediction (e.g., an offer) using different types of inputs. A current system may use one model for each type of input. As a result, there may be a first model for merchant data, a second model for consumer data, etc. However, using separate models prevents capturing the relationships between different types of inputs. For example, considering both the consumer data (e.g., credit score) and the merchant data (e.g., current inventory) by combining them into a shared embedding space, may lead to a different offer that the consumer is more likely to engage with, than if the data were considered separately. Second, a result of creating a shared embedding space is that fewer models are required. For example, POS system 130 and/or cloud server 140 may use a single machine learning model 132. In turn, this will consume fewer computing resources because fewer machine learning models 132 are stored and executed. This is critical in instances where machine learning model 132-1 is operating in real-time on POS system 130 while a consumer is shopping or engaged in a transaction and there is a desire to rapidly predict an offer. Third, the shared embedding space improves data security and privacy. As noted above, financial institutions and merchants are concerned with preventing data leaks. By transforming and merging data from bank server 120 and merchant server 110 along with other data such as current transaction data and data from sensor 160, it is much more difficult for a nefarious third party who gains access to the merged data to decipher it and retrieve the bank or merchant data.

At 330, POS system 130 generates, by a machine learning model at POS system 130 an offer based on the shared embedding of the transaction approval message and merchant inventory data. In some embodiments, the machine learning model may further input and use data from sensor 160 to generate the offer. The machine learning model may be machine learning model 132-1. In some embodiments, the offer may be unique to the transaction. The offer may be unique to the consumer involved in the transaction. The machine learning model may generate one or more offers, each assigned a probability corresponding to the model's confidence that the consumer will use the offer.

The offer may be unique to the transaction because of the inputs used to generate the offer. For example, merchant data at merchant server 110 may be updated based on various events such as when consumers make purchases, when new inventory is delivered, or when products are returned. Similarly, financial events (e.g., deposits, withdrawals, purchases made) may update consumer data at bank server 110. As noted above, data from sensor 160 may also be input to machine learning model 132 to generate an offer. The sensor data may include movements or patterns of the user in the store. The inputs also include transaction data such as the product sought to be purchased and the price. As a result, the exact inputs to machine learning model 132 are unlikely to reoccur again, and as a result, the generated output (e.g., the offer) will be unique.

At 340, POS system 130 outputs the offer. POS system 130 may output the offer with the highest probability score. POS system 130 print a coupon including the offer. The offer may be output to client device 150. For example, POS system 130 may transmit the offer to client device 150 via network 102. The offer may be sent as an email or SMS message, including a website URL to the offer. In some embodiments, POS system 130 may use an API of a software application installed at client device 150 to transmit the offer. Here, the offer may be accessed via the software application at client device 150.

In some embodiments, POS system 130 may validate the offer prior to outputting it. Validation may include determining a discount in the offer is less than a maximum allowable discount parameter. For example, merchant data from merchant server 110 may include a rule that no discount can exceed 40% of a price. Similarly, a rule may determine that no discount can exceed $100. Validation may further include determining an item in the offer is eligible for the offer. For example, merchant data from merchant server 110 may include an item list indicating one or more items available for discount (e.g., a whitelist). Here, POS system 130 may determine whether the item is on the whitelist. Merchant data may further include an item list indicating one or more items blocked from being discounted (e.g., a blacklist). Here, POS system 130 may determine whether the item is on the blacklist.

Validation may further include determining a consumer identified in the offer is eligible, where the determination is made using the consumer data. Bank server 120 may include offer eligibility within the consumer data. This may include a maximum purchase price. For example, bank server 120 may indicate that based on the consumer's transaction history, they are only eligible for offers on items that cost less than or equal to $1000. As an additional example, the maximum purchase price may be correlated with the consumer's credit card maximum. For instance, the maximum purchase price may be 10% of a consumer's credit card maximum.

In some embodiments, POS system 130 may send the offer to merchant server 110 and bank server 120 for validation. Merchant server 110 and bank server 120 may apply rules discussed above or additional rules.

If the offer passes the validation, POS system 130 may output the offer. If the offer fails, POS system 130 output an offer with the next highest probability score. In some embodiments, POS system 130 may use machine learning model 132-1 to generate a new offer. In some embodiments, POS system 130 may use machine learning model 132-1 and machine learning model 132-2 at cloud server 140 to generate a new offer.

Figure 4:
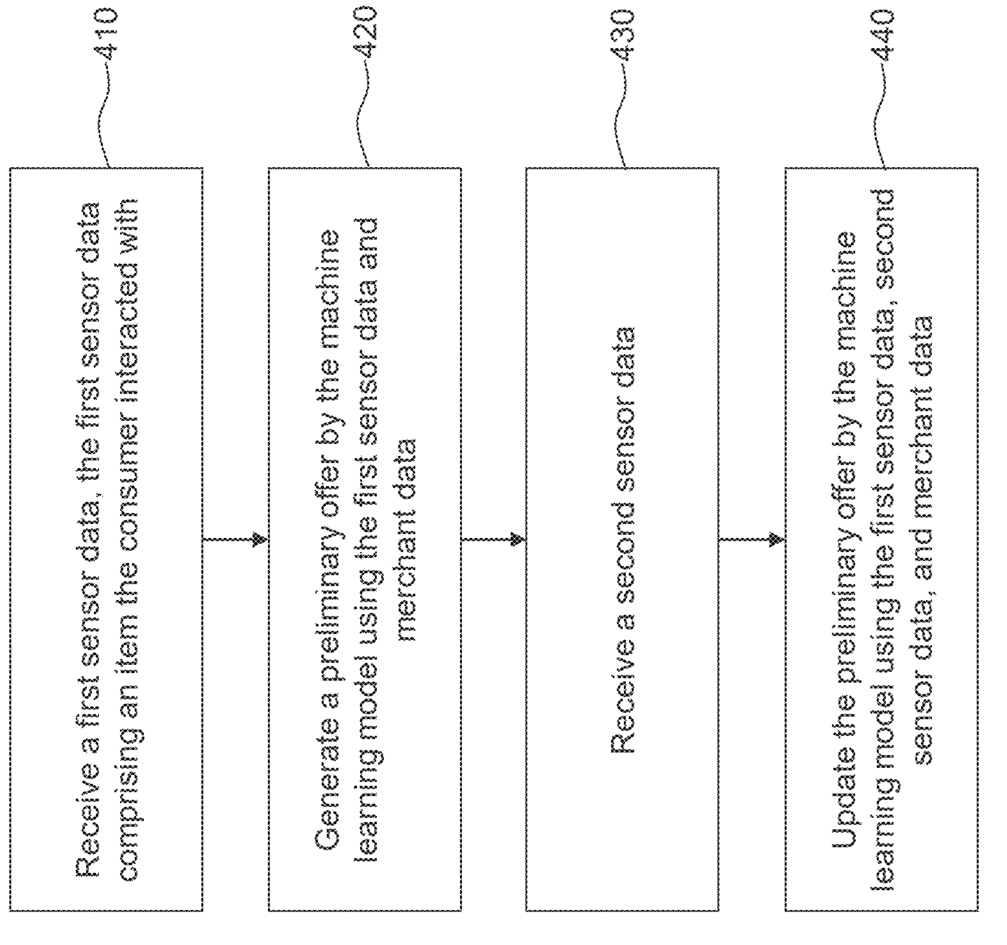
FIG. 4 depicts a flowchart illustrating a method for leveraging sensor data for offer generation, according to some embodiments.

FIG. 4 depicts a flowchart illustrating a method 400 for leveraging sensor data for offer generation, according to some embodiments. Method 400 shall be described with reference to FIG. 1, however, method 400 is not limited to that example embodiment.

In an embodiment, POS system 130 may utilize method 400 to generate a preliminary offer using sensor data. The foregoing description will describe an embodiment of the execution of method 400 with respect to POS system 130. While method 400 is described with reference to POS system 130, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. For example, method 400 may be executed with reference to cloud server 140.

It is to be appreciated that not all steps may be needed to perform the disclosure provided herein. Further, some of the steps may be performed simultaneously, or in a different order than shown in FIG. 4.

At 410, POS system 130 receives a first sensor data, the sensor data comprising an item the purchaser interacted with. The sensor may be sensor 160. For example, sensor 160 may be a camera that captured video of a consumer picking up and looking at a product. As an additional example, sensor 160 may be a weight sensor located underneath a product. Here, the weight sensor may detect that a user picked up the product for 5 seconds based on the detected weight change. Sensor 160 may transmit data to POS system 130.

At 420, POS system 130 generates a preliminary offer by the machine learning model using the first sensor data and merchant data. The machine learning model may be machine learning model 132-1 at POS system 130. POS system 130 may request and use merchant data from merchant server 110. In some embodiments, the machine learning model may further use consumer data from bank server 120. As discussed above, the consumer may approve bank server 120 sending consumer data to POS system 130 prior to a transaction occurring.

At 430, POS system 130 receives a second sensor data. The second sensor data may be from sensor 160. In some embodiments, the first and second sensor data may originate from the same sensor 160. For example, the first and second sensor data may both be from a video camera in the store where the consumer is shopping. In some embodiments, the first and second sensor data may originate from different sensors 160. For example, the first sensor data may be from a video camera and the second sensor data may be from a weight sensor configured to detect the presence of a product.

At 440, POS system 130 updates the preliminary offer by the machine learning model using the first sensor data, second sensor data, and merchant data. As discussed above, POS system 130 may further use consumer data to update the preliminary offer.

POS system 130 may use the preliminary offer to generate a final offer once the consumer makes a transaction. For example, the preliminary offer may be used as an additional input to machine learning model 132 when an offer is generated in response to the consumer initiating a transaction (e.g., purchasing an item at POS system 130).

In some embodiments, POS system 130 may output the preliminary offer to the consumer when they don't make a purchase. For example, a consumer may enter a store, browse various items, but decide not to purchase anything. However, a preliminary offer may have been generated using data from at least one of sensor 160, merchant server 110, and/or bank server 120. Here, POS system 130 may output the preliminary offer to the consumer. As discussed above, POS system 130 may physically print a coupon, transmit the offer to client device 150 used by the consumer, sent to an email address, phone number, or other contact point linked to the consumer.

Figure 5:
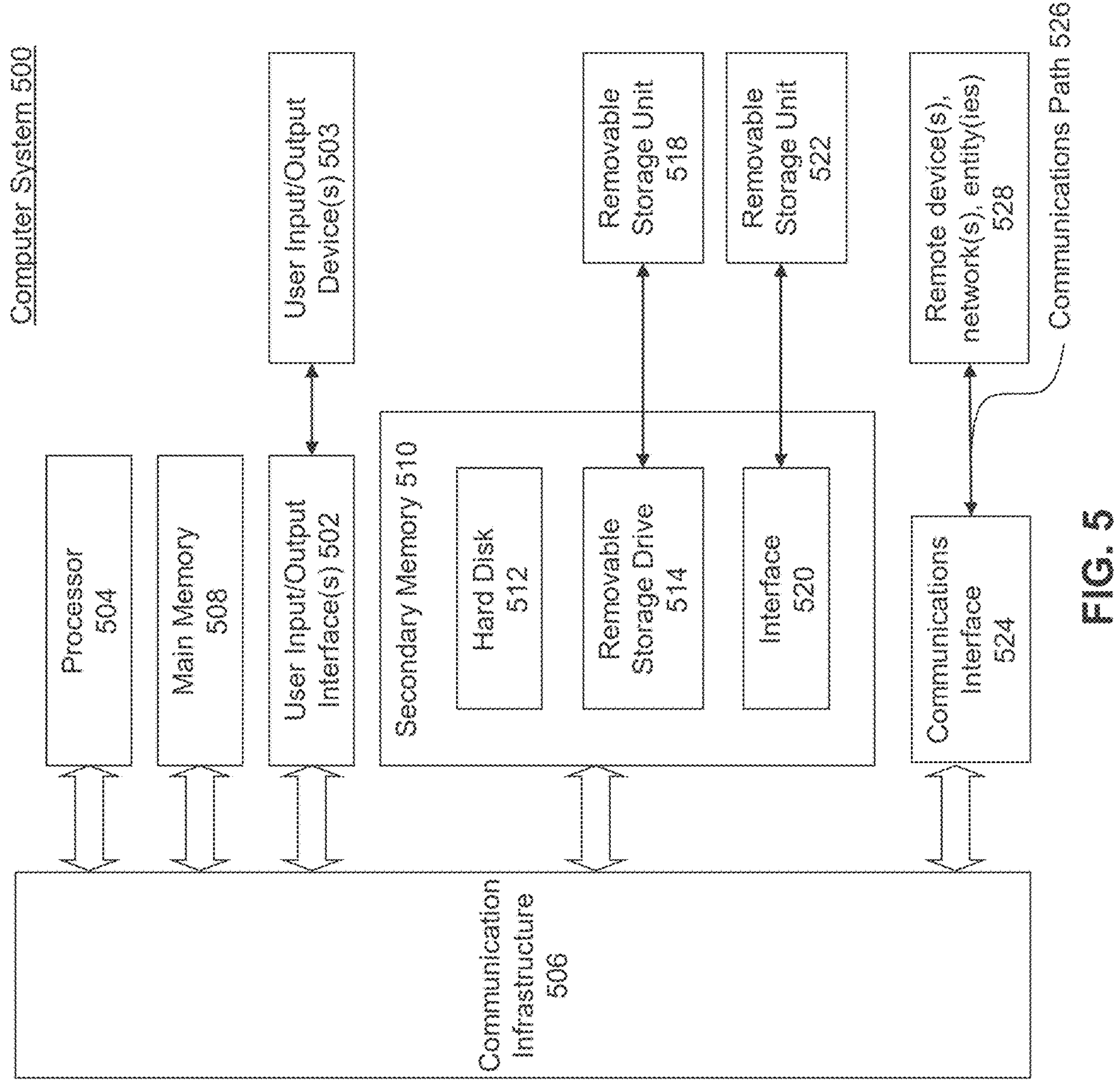
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, the method comprising:

transmitting, from a point-of-sale (POS) system, after receiving a transaction request and prior to completing a transaction identified in the transaction request, (i) a consumer data request to a banking server and (ii) a merchant data request to a merchant server;

receiving, at the POS system, responsive to the consumer data request, anonymized consumer data from the banking server and, responsive to the merchant data request, merchant data from the merchant server, wherein the anonymized consumer data is anonymized by removing personally identifiable information (PII) from consumer data;

combining, at the POS system, transaction data associated with the transaction request, the merchant data, and the anonymized consumer data into a shared embedding space comprising a numerical matrix;

generating, by a machine learning model executed on the POS system, an offer prediction based on the shared embedding space of the transaction data, the anonymized consumer data, and the merchant data, wherein the offer prediction is unique to the transaction;

transmitting, from the POS system, an offer validation request to the banking server and transmitting, from the POS system, an offer validation request to the merchant server, each offer validation request including the offer prediction;

preventing, by the POS system, the merchant data from being transmitted to the banking server;

preventing, by the POS system, the anonymized consumer data from being transmitted to the merchant server; and outputting, via the POS system, prior to completing the transaction, an approved offer responsive to receiving respective validation approvals from the banking server and the merchant server.

2. The computer implemented method of claim 1, further comprising generating a preliminary offer at the POS system when an item is scanned, wherein the preliminary offer is generated based on the scanned item and the merchant data.

3. The computer implemented method of claim 1, wherein prior to outputting the offer, validating the offer by:

determining a discount in the offer is less than a maximum allowable discount parameter;

determining an item in the offer is eligible for the offer; and determining a consumer identified in the offer is eligible, wherein the determination is made using the consumer data.

4. The computer implemented method of claim 1, wherein the offer is further based on a preliminary offer, wherein generating the preliminary offer comprises;

receiving, at the POS system, first sensor data;

generating the preliminary offer by the machine learning model in connection with the POS system, using the first sensor data and the merchant data;

receiving, at the POS system, second sensor data; and updating the preliminary offer by the machine learning model in connection with the POS system, using the first sensor data, the second sensor data, and the merchant data.

5. The computer implemented method of claim 4, wherein prior to receiving the first sensor data, the method further comprises:

detecting, by the POS system, a client device of a consumer by at least one of a software application on the client device or a sensor;

receiving, at the POS system, approval from the client device to track the consumer with the sensor; and in response to receiving approval from the client device, transmitting, by the POS system, a message to the sensor to track the consumer of the client device.

6. The computer implemented method of claim 4, wherein the first sensor data is generated by a first camera, wherein the first sensor data includes first video data indicating a first item the consumer interacted with in a store, wherein the second sensor data is generated by a second camera, and wherein the second sensor data includes second video data indicating a second item the consumer interacted with in the store.

7. The computer implemented method of claim 4, wherein the first sensor data and second sensor data include data from at least one of a camera, microphone, motion sensor, pressure sensors, Global Positioning System (GPS), radio-frequency identification (RFID) sensor, or proximity sensor.

8. A point-of-sale (POS) system, comprising:

a memory; and at least one processor coupled to the memory and configured to perform operations comprising:

transmitting, after receiving a transaction request and prior to completing a transaction identified in the transaction request, (i) a consumer data request to a banking server and (ii) a merchant data request to a merchant server;

receiving, responsive to the consumer data request, anonymized consumer data from the banking server and, responsive to the merchant data request, merchant data from the merchant server, wherein the anonymized consumer data is anonymized by removing personally identifiable information (PII) from consumer data;

combining transaction data associated with the transaction request, the merchant data, and the anonymized consumer data into a shared embedding space comprising a numerical matrix;

generating, by a machine learning model executed on the POS system, an offer prediction based on the shared embedding space of the transaction data, the anonymized consumer data, and the merchant data, wherein the offer prediction is unique to the transaction;

transmitting an offer validation request to the banking server and transmitting, from the POS system, an offer validation request to the merchant server, each offer validation request including the offer prediction;

preventing the merchant data from being transmitted to the banking server;

preventing the anonymized consumer data from being transmitted to the merchant server; and outputting, via the POS system, prior to completing the transaction, an approved offer responsive to receiving respective validation approvals from the banking server and the merchant server.

9. The system of claim 8, wherein the operations further comprise generating a preliminary offer at the POS system when an item is scanned, wherein the preliminary offer is generated based on the scanned item and the merchant data.

10. The system of claim 8, wherein the operations further comprise, prior to outputting the offer, validating the offer by:

determining a discount in the offer is less than a maximum allowable discount parameter;

determining an item in the offer is eligible for the offer; and determining a consumer identified in the offer is eligible, wherein the determination is made using the consumer data.

11. The system of claim 8, wherein the offer is further based on a preliminary offer, wherein to generate the preliminary offer the operations further comprise:

receiving first sensor data;

generating the preliminary offer by the machine learning model using the first sensor data and the merchant data;

receiving second sensor data from a sensor; and updating the preliminary offer by the machine learning model using the first sensor data, the second sensor data, and merchant data.

12. The system of claim 11, wherein the operations further comprise, prior to receiving the first sensor data:

detecting a client device of a consumer by at least one of a software application on the client device or a sensor;

receiving approval from the client device to track the consumer with the sensor; and transmitting, in response to receiving approval from the client device, transmit a message to the sensor to track the consumer of the client device.

13. The system of claim 11, wherein the first sensor data is generated by a first camera, wherein the first sensor data includes first video data indicating a first item the consumer interacted with in a store, wherein the second sensor data is generated by a second camera, and wherein the second sensor data includes second video data indicating a second item the consumer interacted with in the store.

14. The system of claim 11, wherein the first sensor data and second sensor data include data from at least one of a camera, microphone, motion sensor, pressure sensors, Global Positioning System (GPS), radio-frequency identification (RFID) sensor, or proximity sensor.

15. A non-transitory computer-readable device having instructions stored thereon that, when executed by at least one computing device, cause the at least one computing device to perform operations comprising:

transmitting, from a point-of-sale (POS) system, after receiving a transaction request and prior to completing a transaction identified in the transaction request, (i) a consumer data request to a banking server and (ii) a merchant data request to a merchant server;

receiving, at the POS system, responsive to the consumer data request, anonymized consumer data from the banking server and, responsive to the merchant data request, merchant data from the merchant server, wherein the anonymized consumer data is anonymized by removing personally identifiable information (PII) from consumer data;

combining, at the POS system, transaction data associated with the transaction request, the merchant data, and the anonymized consumer data into a shared embedding space comprising a numerical matrix;

generating, by a machine learning model executed on the POS system, an offer prediction based on the shared embedding space of the transaction data, the anonymized consumer data, and the merchant data, wherein the offer prediction is unique to the transaction;

transmitting, from the POS system, an offer validation request to the banking server and transmitting, from the POS system, an offer validation request to the merchant server, each offer validation request including the offer prediction;

preventing, by the POS system, the merchant data from being transmitted to the banking server;

preventing, by the POS system, the anonymized consumer data from being transmitted to the merchant server; and outputting, via the POS system, prior to completing the transaction, an approved offer responsive to receiving respective validation approvals from the banking server and the merchant server.

16. The non-transitory computer-readable device of claim 15, wherein the operations further comprise generating a preliminary offer at the POS system when an item is scanned, wherein the preliminary offer is generated based on the scanned item and the merchant data.

17. The non-transitory computer-readable device of claim 16, wherein the offer is further based on the preliminary offer and wherein the operations further comprise:

receiving, at the POS system, first sensor data;

generating the preliminary offer by the machine learning model in connection with the POS system, using the first sensor data and the merchant data;

receiving, at the POS system, second sensor data; and updating the preliminary offer by the machine learning model in connection with the POS system, using the first sensor data, the second sensor data, and the merchant data.

18. The non-transitory computer-readable device of claim 17, wherein prior to receiving the first sensor data, the operations further comprise:

detecting, by the POS system, a client device of a consumer by at least one of a software application on the client device or a sensor;

receiving, at the POS system, approval from the client device to track the consumer with the sensor; and in response to receiving approval from the client device, transmitting, by the POS system, a message to the sensor to track the consumer of the client device.

19. The non-transitory computer-readable device of claim 17, wherein the first sensor data is generated by a first camera, wherein the first sensor data includes first video data indicating a first item the consumer interacted with in a store, wherein the second sensor data is generated by a second camera, and wherein the second sensor data includes second video data indicating a second item the consumer interacted with in the store.

20. The non-transitory computer-readable device of claim 17, wherein the first sensor data and second sensor data include data from at least one of a camera, microphone, motion sensor, pressure sensors, Global Positioning System (GPS), radio-frequency identification (RFID) sensor, or proximity sensor.

* * * * *